(12) United States Patent
Bloch et al.

(10) Patent No.: US 7,862,875 B2
(45) Date of Patent: *Jan. 4, 2011

(54) FLINGER DISC

(75) Inventors: Heinz P. Bloch, West Des Moines, IA (US); Rojean Thomas, Mukwonago, WI (US); Daniel Freeland, West Allis, WI (US); Jeffrey T Malinowski, Hartford, WI (US)

(73) Assignee: Trico Corporation, Pewaukee, WI (US)

( * ) Notice: Subject to any disclaimer, the term of this patent is extended or adjusted under 35 U.S.C. 154(b) by 321 days.

This patent is subject to a terminal disclaimer.

(21) Appl. No.: 11/827,884

(22) Filed: Jul. 13, 2007

(65) Prior Publication Data

US 2008/0026175 A1 Jan. 31, 2008

Related U.S. Application Data

(63) Continuation-in-part of application No. 10/957,876, filed on Oct. 4, 2004, now abandoned.

(51) Int. Cl.
*F16N 7/26* (2006.01)
(52) U.S. Cl. .................................. 428/66.6; 184/13.1
(58) Field of Classification Search ............... 428/66.6; 184/13.1, 11.1
See application file for complete search history.

(56) References Cited

U.S. PATENT DOCUMENTS

| | | | |
|---|---|---|---|
| 126,624 A | 5/1872 | Coffee |
| 539,117 A | 5/1895 | Busch |
| 779,357 A | 1/1905 | Gardner |
| 805,645 A | 11/1905 | Guillot |
| 992,503 A | 5/1911 | Howard |
| 1,113,276 A | 10/1914 | Woodmansee |
| 1,571,495 A | 2/1926 | Smith |
| 1,600,262 A | 9/1926 | Wickham |
| 1,610,283 A | 12/1926 | Hill |
| 1,687,395 A | 10/1928 | Shew |
| 1,688,279 A | 10/1928 | Locke |
| 1,864,195 A | 6/1932 | Hall |
| 2,227,646 A | 1/1941 | Hillman |
| 2,335,557 A | 11/1943 | Winther |
| 2,340,455 A | 2/1944 | Davis |
| 2,376,623 A | 5/1945 | Romberg |
| 2,397,597 A | 4/1946 | Dunkle |

(Continued)

FOREIGN PATENT DOCUMENTS

CA 2291763 7/2002

(Continued)

OTHER PUBLICATIONS

Office Action; Date Mailed: Jun. 12, 2006; pp. 4; Cited Art: 4 pgs.

(Continued)

*Primary Examiner*—Alexander Thomas
(74) *Attorney, Agent, or Firm*—Ryan Kromholz & Manion, S.C.

(57) ABSTRACT

To achieve proper lubrication, a bearing housing or reservoir is filled with a predetermined amount of lubricant. When the machine, of which a bearing is a component, is operated, a flexible flinger disc provides proper lubrication by disturbance of the lubricant.

4 Claims, 5 Drawing Sheets

U.S. PATENT DOCUMENTS

| | | |
|---|---|---|
| 2,439,709 A | 4/1948 | Asbury |
| 2,589,081 A | 3/1952 | Hertz |
| 2,608,993 A | 9/1952 | Andrews |
| 2,703,628 A | 3/1955 | Pompeo et al. |
| 2,774,621 A | 12/1956 | Kilbourne, Jr. |
| 2,930,432 A | 3/1960 | Engstrom |
| 2,950,943 A | 8/1960 | Forrest |
| 2,995,213 A | 8/1961 | Gross |
| 3,123,095 A | 3/1964 | Kohler |
| 3,193,990 A | 7/1965 | Smith |
| 3,233,173 A | 2/1966 | Lees et al. |
| D205,166 S | 6/1966 | Price |
| 3,323,291 A | 6/1967 | Kern |
| 3,338,262 A | 8/1967 | Chopelin |
| 3,447,562 A | 6/1969 | Hoffman |
| D217,665 S | 5/1970 | Self |
| D217,666 S | 5/1970 | Self |
| D217,667 S | 5/1970 | Self |
| 3,952,566 A | 4/1976 | Jacobson |
| 4,018,579 A | 4/1977 | Hoffmann |
| 4,047,814 A | 9/1977 | Westcott |
| 4,058,766 A | 11/1977 | Vegel et al. |
| 4,064,455 A | 12/1977 | Hopkins et al. |
| 4,105,092 A | 8/1978 | Zeidler et al. |
| 4,227,419 A | 10/1980 | Park |
| 4,312,424 A | 1/1982 | Taylor et al. |
| 4,345,668 A | 8/1982 | Gaunt |
| 4,423,371 A | 12/1983 | Senturia et al. |
| 4,445,168 A | 4/1984 | Petryszyn |
| 4,466,508 A | 8/1984 | Buse |
| 4,503,383 A | 3/1985 | Agar |
| D279,549 S | 7/1985 | Elmburg |
| 4,527,661 A | 7/1985 | Johnstone et al. |
| 4,591,024 A | 5/1986 | Erickson |
| 4,629,334 A | 12/1986 | Hochstein |
| 4,646,070 A | 2/1987 | Yashuhara |
| 4,681,189 A | 7/1987 | Krisiloff |
| 4,689,553 A | 8/1987 | Haddox |
| 4,733,556 A | 3/1988 | Meitzler et al. |
| 4,735,286 A | 4/1988 | Miki et al. |
| 4,738,336 A | 4/1988 | Smith et al. |
| 4,990,057 A | 2/1991 | Rollins |
| 5,025,222 A | 6/1991 | Scott et al. |
| 5,039,425 A | 8/1991 | Caris et al. |
| 5,045,798 A | 9/1991 | Hendrick |
| 5,060,760 A | 10/1991 | Long et al. |
| 5,071,527 A | 12/1991 | Kauffman |
| 5,072,190 A | 12/1991 | Martin |
| 5,080,195 A | 1/1992 | Mizumoto et al. |
| 5,101,936 A | 4/1992 | Paredes et al. |
| 5,103,181 A | 4/1992 | Gaisford et al. |
| 5,125,480 A | 6/1992 | Gregory et al. |
| D333,177 S | 2/1993 | Poirier |
| 5,196,898 A | 3/1993 | Tamura et al. |
| 5,197,569 A | 3/1993 | Roessler et al. |
| 5,200,027 A | 4/1993 | Lee et al. |
| 5,203,680 A | 4/1993 | Waldrop |
| D336,509 S | 6/1993 | Safford et al. |
| D336,679 S | 6/1993 | Safford et al. |
| 5,224,051 A | 6/1993 | Johnson |
| D338,158 S | 8/1993 | Poirier |
| 5,249,455 A | 10/1993 | Cox |
| 5,260,665 A | 11/1993 | Goldberg et al. |
| 5,262,732 A | 11/1993 | Dickert et al. |
| 5,269,175 A | 12/1993 | Chmiel et al. |
| 5,271,528 A | 12/1993 | Chien |
| 5,273,134 A | 12/1993 | Hegemier et al. |
| 5,274,335 A | 12/1993 | Wang et al. |
| 5,314,613 A | 5/1994 | Russo |
| 5,317,252 A | 5/1994 | Kranbuehl |
| 5,318,152 A | 6/1994 | Ehlert |
| 5,328,275 A | 7/1994 | Winn et al. |
| 5,330,636 A | 7/1994 | Reichert |
| 5,332,064 A | 7/1994 | Liu |
| 5,334,941 A | 8/1994 | King |
| 5,381,874 A | 1/1995 | Hadank et al. |
| 5,382,942 A | 1/1995 | Raffa et al. |
| 5,125,480 A | 4/1995 | Gregory et al. |
| D358,097 S | 5/1995 | Leibowitz |
| D358,548 S | 5/1995 | Platte |
| 5,457,396 A | 10/1995 | Mori et al. |
| 5,499,902 A | 3/1996 | Rockwood |
| 5,504,573 A | 4/1996 | Cheiky-Zelina |
| 5,521,515 A | 5/1996 | Campbell |
| 5,540,086 A | 7/1996 | Park et al. |
| 5,542,499 A | 8/1996 | Westermeyer |
| 5,548,217 A | 8/1996 | Gibson et al. |
| 5,568,842 A | 10/1996 | Otani |
| 5,596,266 A | 1/1997 | Mori et al. |
| 5,604,441 A | 2/1997 | Freese |
| 5,614,830 A | 3/1997 | Dickert et al. |
| 5,634,531 A | 6/1997 | Graf et al. |
| 5,647,735 A | 7/1997 | Rockwood |
| 5,656,767 A | 8/1997 | Garvey, III et al. |
| 5,671,825 A | 9/1997 | Wong et al. |
| 5,674,401 A | 10/1997 | Dickert et al. |
| 5,702,592 A | 12/1997 | Suri et al. |
| 5,754,055 A | 5/1998 | McAdoo |
| 5,779,005 A | 7/1998 | Jones, Jr. et al. |
| 5,789,665 A | 8/1998 | Voelker et al. |
| 5,806,630 A | 9/1998 | Bernal |
| 5,816,212 A | 10/1998 | Lindquist et al. |
| 5,824,889 A | 10/1998 | Park et al. |
| 5,826,986 A | 10/1998 | Adkins et al. |
| 5,858,070 A | 1/1999 | Halm et al. |
| 5,878,842 A | 3/1999 | Rake |
| 5,884,802 A | 3/1999 | Leibowitz |
| 6,028,433 A | 2/2000 | Cheiky-Zelina et al. |
| 6,077,330 A | 6/2000 | Sabelstrom |
| 6,113,676 A | 9/2000 | Kumpulainen |
| 6,192,025 B1 | 2/2001 | Chen |
| 6,204,656 B1 | 3/2001 | Cheiky-Zelina et al. |
| 6,223,589 B1 | 5/2001 | Dickert et al. |
| 6,250,152 B1 | 6/2001 | Klein et al. |
| 6,253,601 B1 | 7/2001 | Wang et al. |
| 6,273,031 B1 | 8/2001 | Verdegan et al. |
| 6,277,173 B1 | 8/2001 | Sadakata et al. |
| 6,278,282 B1 | 8/2001 | Marszalek |
| 6,368,411 B2 | 4/2002 | Roberson, Jr. et al. |
| 6,443,006 B1 | 9/2002 | Degrave |
| 6,447,573 B1 | 9/2002 | Rake |
| 6,449,580 B1 | 9/2002 | Bardetsky et al. |
| 6,459,995 B1 | 10/2002 | Collister |
| 6,460,656 B1 | 10/2002 | Jones, Jr. et al. |
| 6,509,749 B1 | 1/2003 | Buelna et al. |
| 6,513,368 B2 | 2/2003 | Bondarowicz et al. |
| 6,519,034 B1 | 2/2003 | Engler et al. |
| 6,535,001 B1 | 3/2003 | Wang |
| 6,551,055 B2 | 4/2003 | Rockwood |
| 6,553,812 B2 | 4/2003 | Park et al. |
| 6,557,396 B2 | 5/2003 | Ismail et al. |
| 6,564,126 B1 | 5/2003 | Lin et al. |
| 6,568,919 B1 | 5/2003 | Fletcher et al. |
| D485,189 S | 1/2004 | Montalbano et al. |
| 6,851,676 B2 | 2/2005 | Martins et al. |
| 6,932,856 B2 | 8/2005 | Rake |
| 7,017,712 B1 | 3/2006 | Rake et al. |
| D527,639 S | 9/2006 | Voss et al. |
| D528,425 S | 9/2006 | Van Dorin et al. |
| 7,140,468 B2 | 11/2006 | Rake et al. |
| D573,885 S | 7/2008 | Considine et al. |
| D589,597 S * | 3/2009 | Bloch et al. ................ D23/249 |
| D589,807 S | 4/2009 | Gundrum et al. |
| D589,808 S | 4/2009 | Gundrum et al. |

| | | | |
|---|---|---|---|
| D589,809 S | | 4/2009 | Gundrum et al. |
| 7,541,004 B2 | | 6/2009 | Niksa et al. |

FOREIGN PATENT DOCUMENTS

| | | |
|---|---|---|
| CA | 2289726 | 3/2003 |
| CA | 122622 | 4/2009 |
| CA | 127724 | 5/2009 |
| CA | 127725 | 5/2009 |
| CA | 127726 | 5/2009 |
| DE | 37325 | 3/1968 |
| GB | 121092 | 12/1918 |
| JP | 2-308916 | 12/1990 |
| JP | 411132304 A | 5/1999 |

OTHER PUBLICATIONS

Response to Office Action; Amendment A; Date: Dec. 13, 2006.
Notice of Non-Compliant Amendment; Date Mailed: Jan. 4, 2007; pp. 2.
Response to Notice to Non-Compliant; Supplemental Amendment; Dated: Jan. 10, 2007; pp. 2; Drawings: pp. 4.
Final Office Action; Date Mailed: Feb. 13, 2007; pp. 6; Cited Art: 1 Pgs.
Amendment, Petition and Fee for Extension of Time to Maintain Parent Case Which is to Be Abandoned When Filing New Application Claiming Its Benefit; Dated: Jul. 13, 2007.
Notice of Abandonment; Date Mailed: Oct. 3, 2007.
Measuring Moisture in Liquids; a New Method, *Sensors*, Dec. 1996 pp. 42-47.
International Search Report, dated Jan. 20, 1999 for PCT/US98/09039, International Filing Date May 8, 1998.
Iotech Catalog, p. 65, Jan. 1995.
"Model 958PF On-Line Ferrograph", *Foxboro Analytical*, (no month available) 1980, 4 pgs.
958F Series On-Line Ferrograph Installation and Operation, The Foxboro Company, (no month available) 1980, 6 pgs.
"Journal Reprints", The British Institute of Non-Destructive Testing, M.H. Jones and A.R. Massoudi, Insight, vol. 37 No. 8, Aug. 1995. pp. 606-610.
"Basics of Measuring the Dielectric Properties of Materials", Hewlett Packard, (no month available) 1992, No. 1217-1.
"The Nist 60-Millimeter Diameter Cylindrical Cavity Resonator: Performance Evaluation for Permittivity Measurements", Eric J. Vanzura, Richard G. Geyer and Michael D. Janezic, Aug. 1993, National Institute of Standards and Technology Technical Note.
"Advancement of Predict/DLI Industrial Sensors", M.A. Cheiky-Zelina, R.W. Brown and D.E. Schuele, Department of Physics, Case Western Reserve University, Mar. 1997.

\* cited by examiner

FLINGER DISC

RELATED APPLICATIONS

This application is a continuation-in-part of U.S. patent application Ser. No. 10/957,876, filed 4 Oct. 2004, now abandoned.

BACKGROUND OF THE INVENTION

Lubrication is an important aspect of maintaining machinery in proper operating condition. Machine elements such as bearings, journals, shafts, and joints require proper lubrication between their moving surfaces to decrease friction, prevent contamination, reduce wear and dissipate heat. Improper lubrication is likely to lead to premature component wear and component or system failure.

When determining the optimal lubrication between moving machine elements, many factors should be considered. These factors include the mode of operation of the machine, the type of machine element to be lubricated, the environment of the machine, the operating speed of the machine, the lubricant's viscosity, the lubricant's temperature, the lubricant's ingredients, and the lubricant's condition.

Prior art lubricators, such as the TRICO OptoMatic oiler, supply a constant level of lubricant within a lubricant reservoir to a machine element. The lubricant level is predetermined for the particular application and cannot be changed during the operating time of the machine to which the constant level lubricator is attached. Although this type of lubricator provides reasonable performance in many steady-state operations, multiple variables can create unacceptable operating conditions and lead to premature wear, or even failure, of machine elements. The variables include "on" and "off" operating modes (machine cycling), oil viscosity, machine speed, lubricant temperature, lubricant condition, and lubricant vessel pressure.

Other devices, such as the TRICO Hydrolert indicate by LED signals the status of the equipment's lubrication such as lubricant condition within acceptable levels, lubricant condition at the upper limit of acceptable levels, and lubricant condition immediate action required. This device is effective because an operator is signaled only when the lubricant condition is at the upper limit of acceptable levels or if immediate action is required. This reduces maintenance costs and productivity is enhanced.

There are various means that different pump manufacturers are using for lubricating bearings within a pump. The three most common are: 1) oil bath/splash 2) pure oil mist and 3) purge oil mist. Oil bath/splash is the most common means of lubricating the bearings.

Oil splash typically occurs by 3 different ways: 1) oil level is at the bottom of the bearing roller elements resulting in continuous contact with the oil 2) oil level is below bearings, and oil rings are used to splash oil to top of bearing or 3) oil level is either at or slightly below bearings and Flinger discs are used to splash oil. For pure oil mist systems, no flingers or rings are used. For purge oil mist systems, flingers, oil rings may be used in conjunction with mist system.

What method the pump manufacturer uses for lubricating the bearings depends on speed as well as various other various factors that affect the overall temperature.

The purpose of either a flinger disc or oil ring is 1) to provide lubricant to the bearing and 2) prevent thermal stratification of the oil (hot/cold). Traditional flinger discs are limited in diameter by the design of the housing. Oil rings generally are capable of dipping further into the oil bath. An oil ring is typically equal to 1.6 times the diameter of the shaft.

Figure 1:
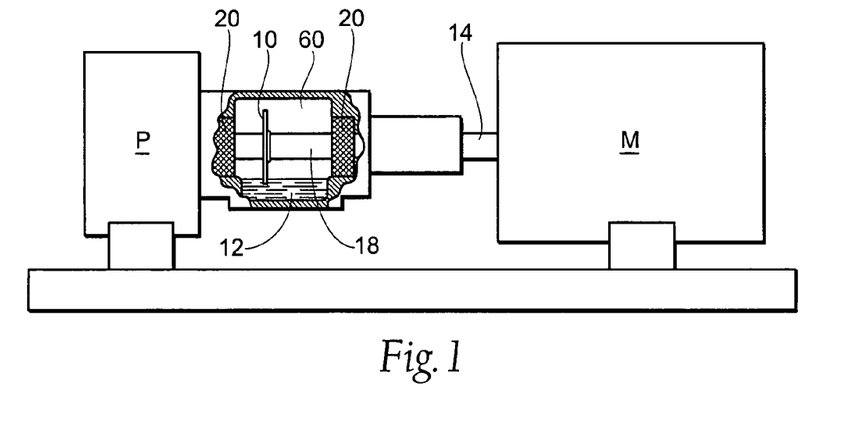
FIG. 1. is a side view, with portions broken away, of the workpiece to which the flinger disk of the present invention is advantageously applied.
Figure 1A:
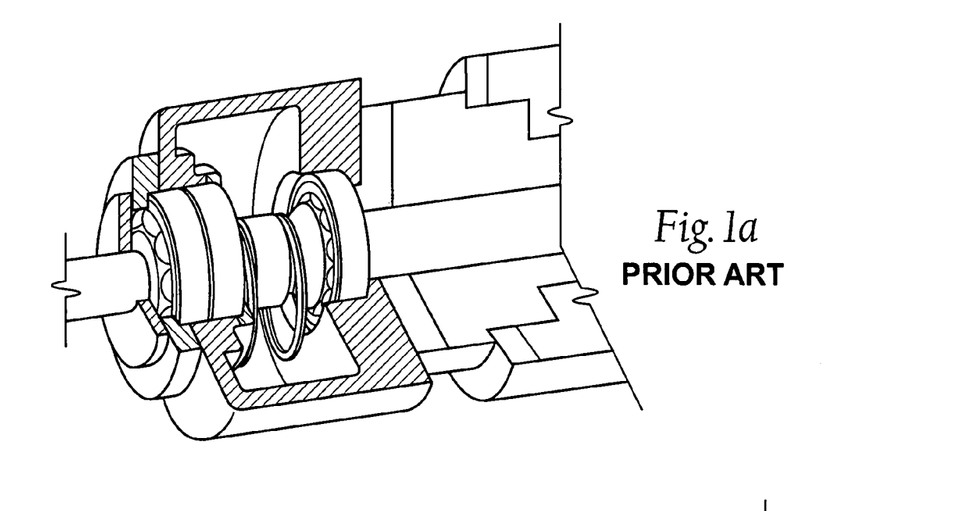
FIG. 1a is a side view, with portions broken away, of a prior art oil ring design.
Figure 1B:
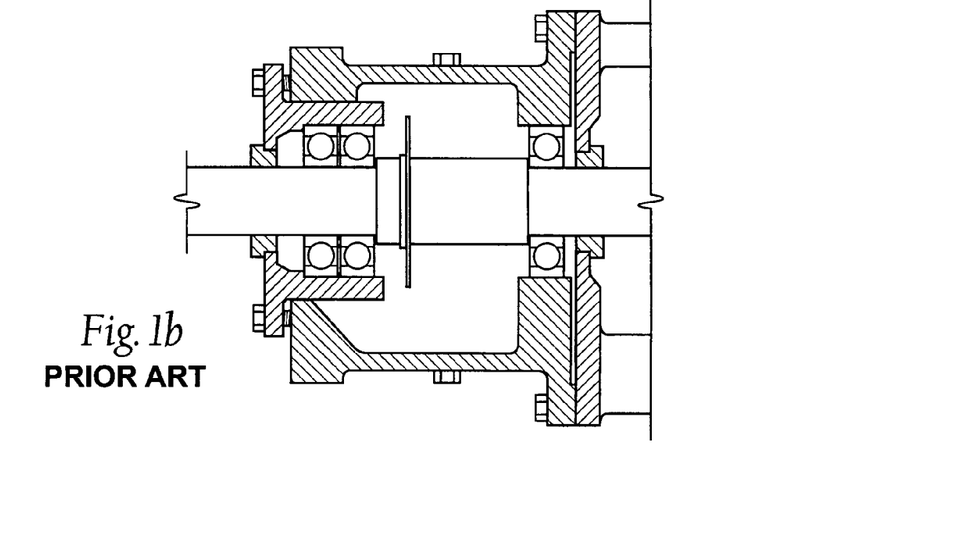
FIG. 1b is a side view, with portions broken away, of a prior art flinger disk design.

FIGS. 1a and 1b show prior art oil ring and flinger disk designs, respectively.

SUMMARY OF THE INVENTION

The flinger disc of the present invention comprises a disk that is flexible during installation and allows for submersion into the oil bath, as the traditional oil ring does. The ring can comprise polypropylene, but preferably Viton™, or other oil compatible and resistant material.

In a preferred embodiment, the thickness of the disc is roughly 1/16" to 3/32" and submerses in the oil bath about 3/8". The flinger disc preferably has a steel hub to maintain concentricity and be positively secured to the shaft.

Also in a preferred embodiment, grooves are molded into the either Viton™ or flexible plastic disc portion at different diameters to allow for flexibility. Scissors can be used to cut out the required diameter and adjust the level of submersion into the oil.

Perceived advantages of the present invention comprise a reduction in temperature; increased bearing life; increased lubrication life; possibility to run at higher speeds; reduction in required oil level; maintain bearing life while consuming less oil; reduction in energy costs; elimination of contamination by wearing of Oil rings. Additionally, the flinger disc of the present invention advantageously provides: 1) same submersion level in oil as oil rings 2) not sensitive to horizontality; 3), not sensitive to wear and 4) easier assembly and disassembly of pump drive end.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure.

While the preferred embodiment has been described, the details may be changed without departing from the invention.

Referring now to FIG. 1, a side view, with portions broken away, of the workpiece to which the flinger disk of the present invention is advantageously applied is shown, although the invention can be applied in different work environs. In FIG. 1, the workpiece is shown as a centrifugal pump P with a motor M. The invention provides an optimal lubrication condition to machine element or bearings 20 by providing a flinging of the lubricant 12, such as oil. In FIG. 1, the bearings 20 are viewed from the side, with their front profile generally doughnut shaped. The lubricant 12 is contained within a fluid reservoir, or bearing housing 60. Typically, two bearings 20 are located within the bearing housing 60. Bearing 20 includes an inner race, an outer race, and a plurality of rolling ball elements positioned between inner race and outer race (not shown). In order for bearing 20 to perform its function of maintaining a low friction precision relationship between a rotating element or shaft 18 and bearing housing 60, the bearing 20 must operate in an environment where it receives proper lubrication.

To achieve proper lubrication, bearing housing or reservoir 60 is filled with a predetermined amount of lubricant 12. When the machine, of which bearing 20 is a component, is in a static state, the amount of lubricant 12 within the housing 60, the pressure of the lubricant 12, the distribution of the lubricant 12 within the housing 60, and the temperature of the lubricant 12 are constant.

Figure 2:
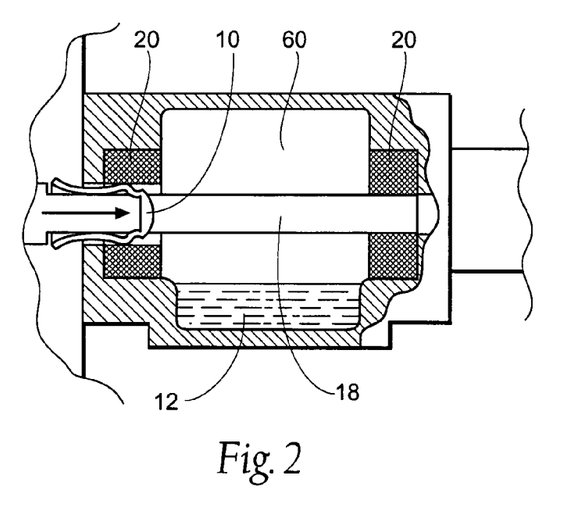
FIG. 2 is a side view, with portions broken away, of a flinger disk being installed into the workpiece.

The polyurethane flinger disc of the present invention is installed on the shaft as shown in FIGS. 1 and 2.

To test the efficacy of the present invention, a quantity of four thermal couples were installed, 1) bottom of sump 60 2) near the bearing 20 3) at top near the flinger disc 10 and 4) at the side port where the flinger disk 10 is shown in FIG. 2. A total of 16 different scenarios were tested varying oil level, type of oil and speed of pump. Each test was run for an 8 hour time period with continuous temperatures being recorded at each thermocouple. Synthetic 68 weight oil was tested first due to availability but all other tests represent mineral oil.

Below are charts outlining the test results for the 16 different 8 hour tests that were ran.

Test Results

| Set up | Max temp. per sensor | | | | Max temp average |
|---|---|---|---|---|---|
| | Bottom | Bearing | Flinger | Side port | |
| Flinger disc ISO 32 1800 rpm Oil @ CL bearing | 96.8 | 96.7 | 96.8 | 96.3 | 96.7 |
| Flinger disc ISO 32 1800 rpm Oil @ 3/8" below CL bearing | 92.5 | 92.3 | 92.9 | 95 | 93.2 |
| No disc ISO 32 1800 rpm Oil @ CL bearing | 81 | 84.2 | 83.3 | 83.3 | 83.0 |
| Flinger disc ISO 32 3600 rpm Oil @ CL bearing | 97.2 | 96.8 | 96.7 | 96.85 | 96.9 |
| Flinger disc ISO 32 3600 rpm Oil @ 3/8" below CL bearing | 90 | 91.4 | 91.1 | 95.4 | 92 |
| No disc ISO 32 3600 rpm Oil @ CL bearing | 91.8 | 100.8 | 96.5 | 102.4 | 97.9 |
| Flinger disc ISO 68 (syn) 1800 rpm Oil @ CL bearing | 96.7 | 95.2 | 96.1 | 96.7 | 96.2 |
| Flinger disc ISO 68 (min) 1800 rpm Oil @ CL bearing | 95.9 | 95.2 | 95.6 | 95 | 95.4 |
| Flinger disc ISO 68 (syn) 1800 rpm Oil @ 3/8"below CL bearing | 88.9 | 89.6 | 93.4 | 90.9 | 90.7 |
| Flinger disc ISO 68 (min) 1800 rpm Oil @ 3/8"below CL bearing* | 94.5 | 95.9 | 101 | 101.5 | 98.2* |
| No disc ISO 68 (min) 1800 rpm Oil @ CL bearing | 87.7 | 90.3 | 89.8 | 91.1 | 89.7 |
| Flinger disc ISO 68 (syn) 3600 rpm Oil @ CL bearing | 104.8 | 104.6 | 105.1 | 104.9 | 104.9 |
| Flinger disc ISO 68 (min) 3600 rpm Oil @ CL bearing | 105.5 | 104.2 | 105.5 | 104.9 | 105.0 |
| Flinger disc ISO 68 (syn) 3600 rpm Oil @ 3/8"below CL bearing | 97 | 101.7 | 105.8 | 99.9 | 101.1 |
| Flinger disc ISO 68 (min) 3600 rpm Oil @ 3/8"below CL bearing | 92 | 96.7 | 103.5 | 104.2 | 99.1 |
| No disc ISO 68 (min) 3600 rpm Oil @ CL bearing | 93.1 | 98 | 97.6 | 103.5 | 98.1 |

*Note:
flinger not touching oil due to cupping (see below)

Average Maximum Temperature

| | No Disc w/Oil @ CL | Flinger w/Oil @ CL | Flinger w/Oil @ 3/8" below CL |
|---|---|---|---|
| ISO 32 Mineral | | | |
| 1800 rpm | 83.0 | 96.7 | 93.2 |
| 3600 rpm | 97.8 | 96.9 | 92.0 |

-continued

Test Results

| ISO 68 Synthetic | | | |
|---|---|---|---|
| 1800 rpm | Not ran | 96.2 | 90.7 |
| 3600 rpm | Not ran | 104.9 | 101.1 |

*During this test the flinger was not touching the oil consistently due to cupping.

A review of the results was completed and the 0.090" thick Viton disc provided the best overall temperatures and durability.

The results show that the flinger disc would perform favorably when compared to typically oil ring applications where speeds tend to be 3,600 rpm.

The additional graphs shown in FIGS. 5-8 contain temperature readings for 0.090" thick Viton disc with oil level below the bearings as compared to no disc and the oil in direct contact with the bearings.

The test results from the in-house lab testing are favorable with difference in temperatures observed being relatively small (+1-15%) between running with no disc and running with the flinger when the oil level is dropped below the bearing. When operating at 3600 rpm there is a more noticeable improvement resulting in improved performance of a Viton flinger disc over traditional oil ring applications.

Comments from Test Results:
  The highest temperatures were observed when using the flinger disc 10 and when the bearings were in direct contact with the oil 12. This would be expected due to the additional heat generated from the flinger 10 dragging through the oil 12 as well as the bearing 20.
  Test with 68 mineral oil @ 1800 rpm oil below centerline is not reflective due to cupping (see below) and not contacting the oil properly.
  The flinger disc (with oil below bearing) performs better at the higher operating speed having the lowest operating temperature when using 32 wt oil and is only 1 degree higher than no disc with the 68 wt oil.
  As expected, higher temperatures occur when using a heavier weight oil.

The results show that the flinger disc 10 would perform favorably when compared to typically oil ring applications where speeds tend to be 3,600 rpm.

FIG. 2 is a side view, with portions broken away, of a flinger disk 10 being installed into the workpiece. Because the flinger disk 10 is of a flexible nature, it can be slid about the shaft 18 into the void space 60. The disk 10 is provided with a flexibility to bend the disk to a second cross-sectional area less than a first cross-sectional area, as shown, for insertion into a confined space.

Figure 3:
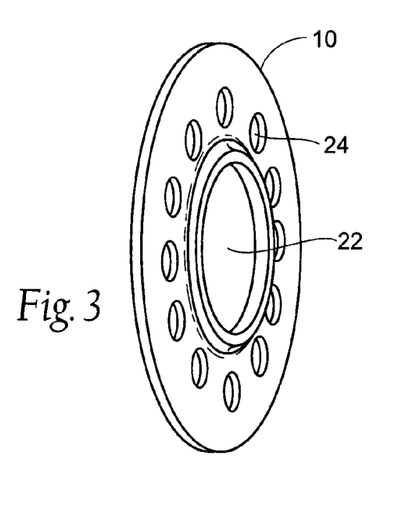
FIG. 3 is a perspective view of the flinger disk of the present invention.

FIG. 3 is a perspective view of the flinger disk 10 of the present invention. As can be seen, the flinger disk 10 is preferably provided with void spaces 24 to decrease weight.

Figure 4:
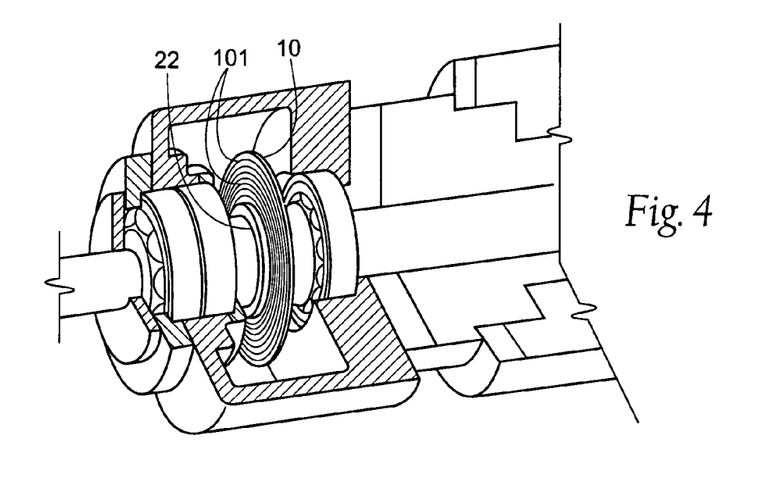
FIG. 4 is a perspective view of an alternate embodiment of flinger disk of the present invention.
Figures 4A, 4B, 4C, 4D:
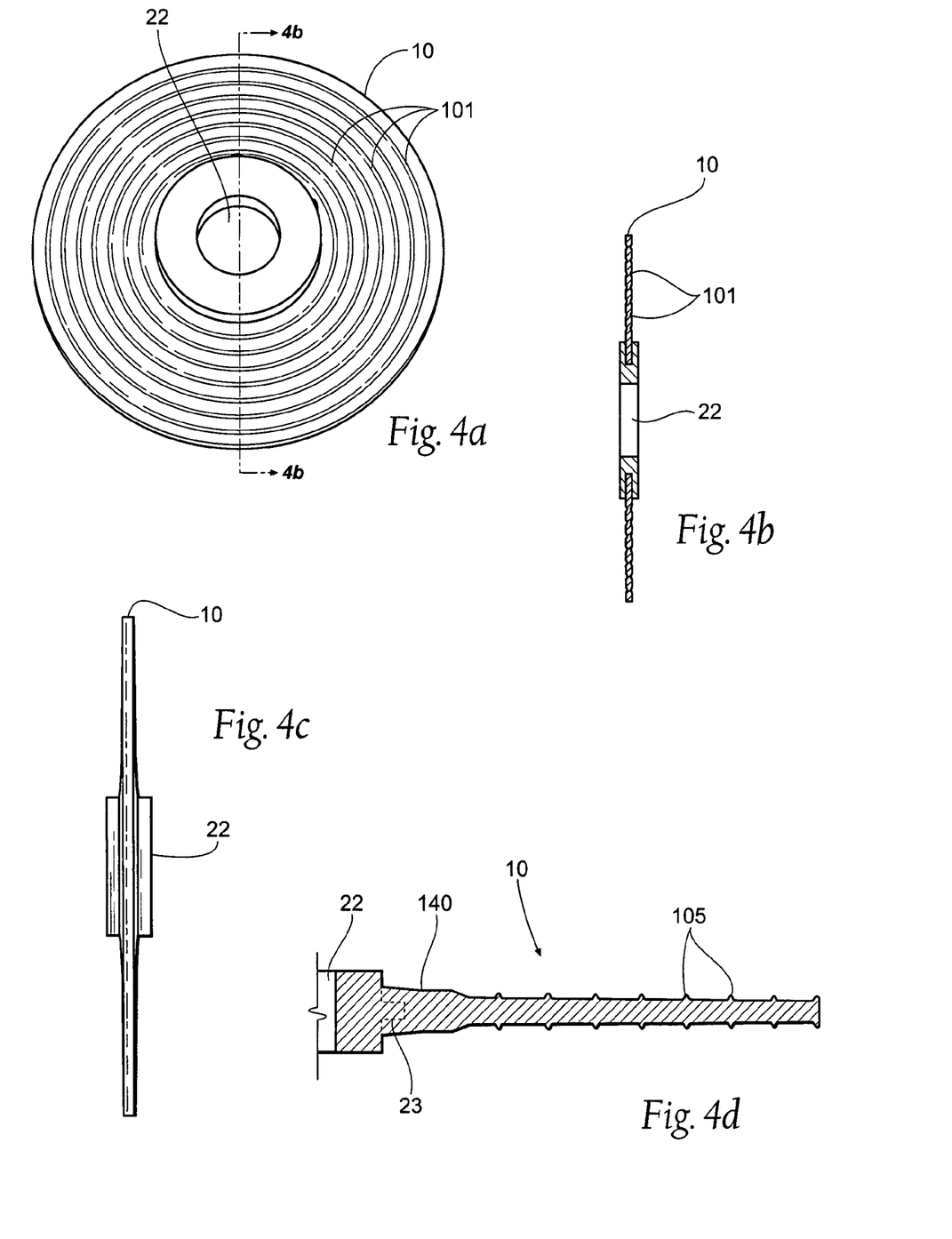
FIG. 4a is a front view of an alternate embodiment of flinger disk of the present invention.
FIG. 4b is a front view of an alternate embodiment of flinger disk of the present invention, with portions being cut away.
FIG. 4c is a side view of a second alternate embodiment of flinger disk of the present invention.
FIG. 4d is a cross sectional view of the second alternate embodiment of flinger disk of the present invention, with portions being cut away.
Figure 5:
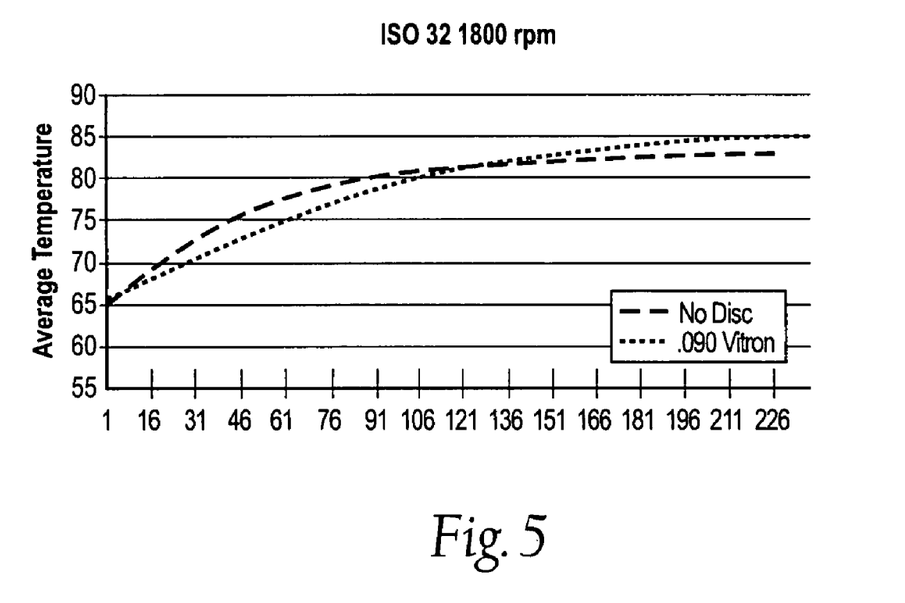
FIGS. 5-8 represent performance graphs of flinger disks.
Figure 6:
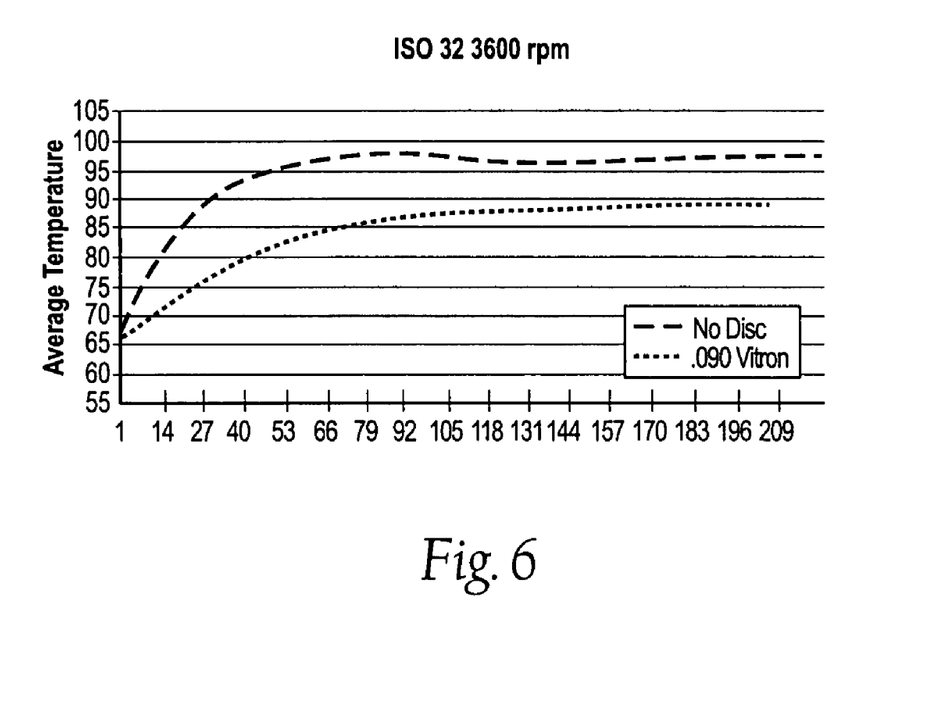
Figure 7:
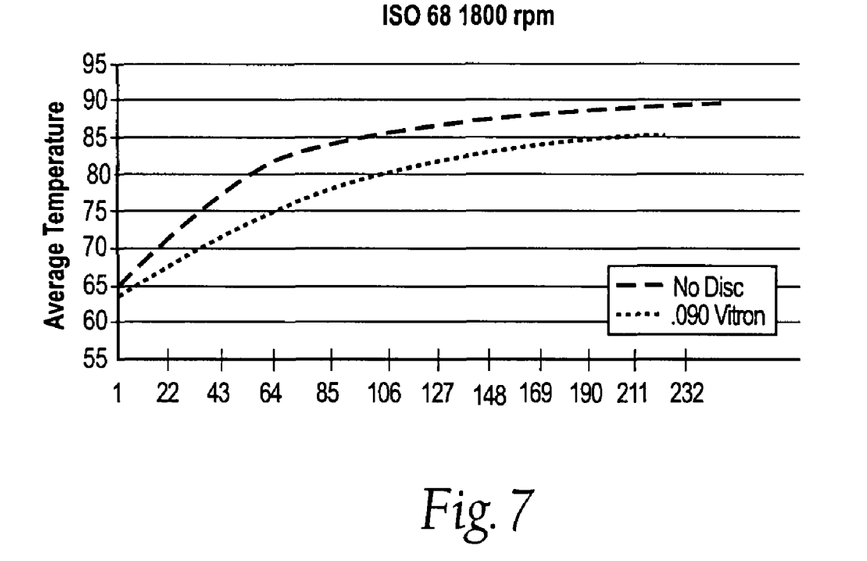
Figure 8:
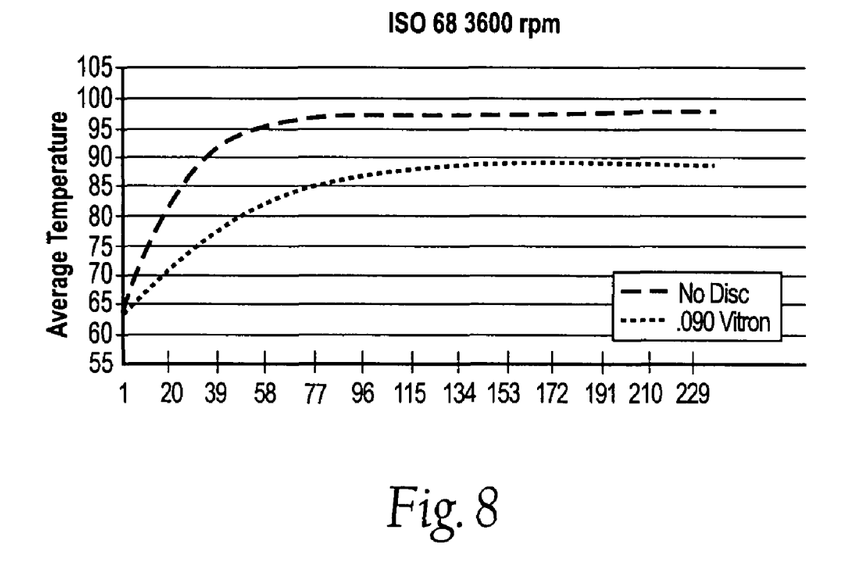

Referring now to FIGS. 4, 4a and 4b, grooves 101 are molded into the either Viton™ or flexible plastic disc 10 at different diameters from the center 22 to allow for flexibility. Scissors can be used to cut out the required diameter and adjust the level of submersion into the oil.

Referring now to FIGS. 4c and 4d, a second alternate embodiment of a flinger disk of the present invention is shown. In this embodiment, the flinger disk 10 is provided with ridges 105. As can be seen, the center 22 is coupled via coupler 23 with the remainder of the disk 10. Between the center of the disk 22 and the ridges 105, it can be seen that tapered portion 140 is provided, with a thicker cross section towards the center of the disk 22. Thus, the disk 10 is tapered from thicker near the center 22 to thinner near the periphery of the disk 22, as can be seen from FIG. 4C.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A disk for insertion into an enclosed space; said disk comprising:
  a non-metallic body having an outer diameter and a first cross-sectional area;
  a hole through an interior region of said body;
  said disk of a flexibility to bend to a second cross-sectional area less than said first cross-sectional area;
  a top portion of said disk tapering from a first thickness at a center region of said disk to a second thickness at a peripheral region of said disk, said first thickness greater than said second thickness; and
  a bottom portion of said disk tapering from said first thickness at a center region of said disk to said second thickness at a peripheral region of said disk, said first thickness greater than said second thickness; and
  said disk having a plurality of cross sectional variations on both said top and bottom portions of said disk spaced apart at differing radial distances from said hole; and spaced apart to substantially the outer diameter of said body.

2. A disk according to claim 1, wherein said cross sectional variations comprise ridges.

3. A disk according to claim 1, wherein said cross sectional variations comprise grooves.

4. A disk according to claim 1, wherein said disk is positioned within a lubricant containing body and configured to disburse lubricant within said lubricant containing body.

* * * * *